United States Patent [19]

Sellier

[11] Patent Number: 5,569,121
[45] Date of Patent: Oct. 29, 1996

[54] TORQUE GENERATOR DEVICE, APPLICATION THEREOF TO PHYSICAL EXERCISE APPARATUS, AND VARIABLE SPEED MOTOR DRIVE THEREFOR

[76] Inventor: Bruno Sellier, 7 rue de la Mairie, 94120 Fontenay Sous Bois, France

[21] Appl. No.: 291,856

[22] Filed: Aug. 17, 1994

[30] Foreign Application Priority Data

Aug. 17, 1993 [FR] France .................................. 93 10052

[51] Int. Cl.$^6$ .................................................. A63B 21/005
[52] U.S. Cl. .................................. 482/5; 482/9; 318/806
[58] Field of Search ................................. 482/5, 6, 8, 9, 482/903; 318/432, 798, 799, 805–807

[56] References Cited

U.S. PATENT DOCUMENTS

| 4,084,810 | 4/1978 | Forsman ...................................... 482/5 |
| 4,138,106 | 2/1979 | Bradley . |
| 4,456,868 | 6/1984 | Yamamura et al. ..................... 318/806 |
| 4,757,248 | 7/1988 | Fujioka et al. .......................... 318/807 |
| 4,885,518 | 12/1989 | Schauder .................................. 318/798 |
| 4,907,797 | 3/1990 | Gezari et al. . |
| 4,979,733 | 12/1990 | Prud'Hon . |
| 5,117,170 | 5/1992 | Keane et al. . |

FOREIGN PATENT DOCUMENTS

| 0231631 | 8/1987 | European Pat. Off. . |
| 0267071 | 5/1988 | European Pat. Off. . |
| 2575658 | 2/1987 | France . |
| 2578431 | 7/1987 | France . |
| 2580442 | 7/1988 | France . |
| 2581552 | 8/1988 | France . |
| 2157578 | 10/1985 | United Kingdom . |

Primary Examiner—Richard J. Apley
Assistant Examiner—John M. Mulcahy
Attorney, Agent, or Firm—Loeb & Loeb LLP

[57] ABSTRACT

A torque generator device for simulating in physical exercise apparatus a load opposing a force exerted by a user includes an asynchronous motor controlled by a variable speed drive of the flux vector control reversible type whose current is controlled by a torque regulator loop. The variable speed drive fixes the flux in the motor so that the torque can be controlled independently. The torque regulator loop processes measurements from a force sensor which it compares with a force set point to control the current fed into the motor by the variable speed drive. The device thus generates a constant torque which opposes the force exerted by the user.

5 Claims, 2 Drawing Sheets

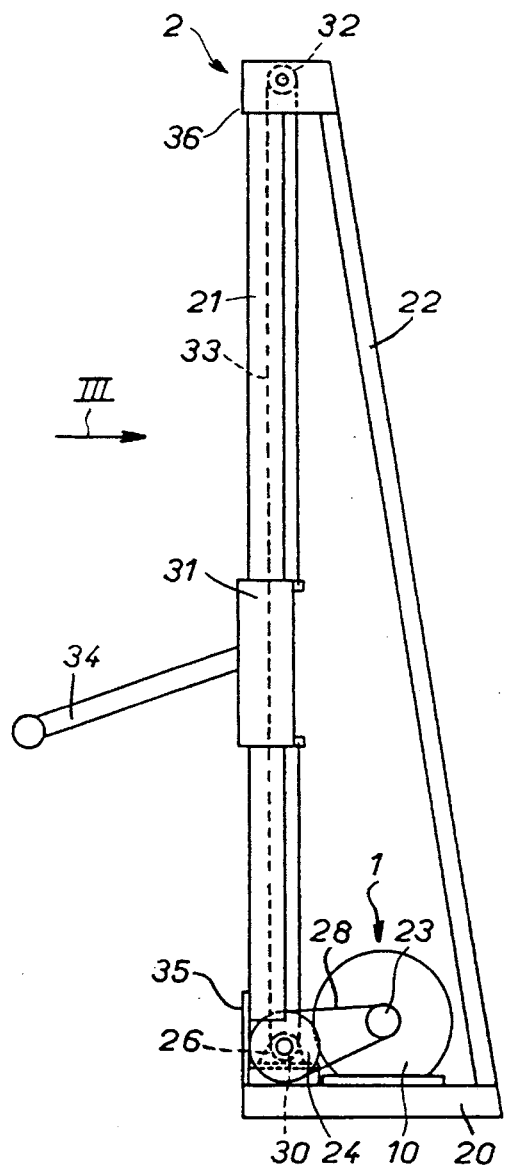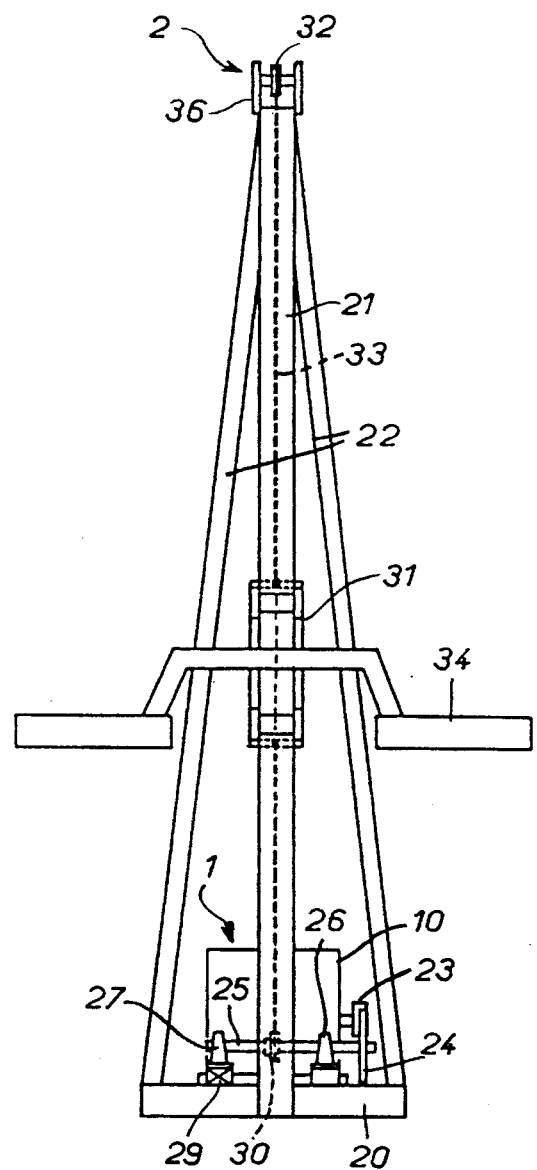

TORQUE GENERATOR DEVICE, APPLICATION THEREOF TO PHYSICAL EXERCISE APPARATUS, AND VARIABLE SPEED MOTOR DRIVE THEREFOR

BACKGROUND OF THE INVENTION

1. Field of the invention

The present invention concerns a torque generator device for simulating a load opposing a force. The force in question can be either a physical force exerted by a user or a mechanical force exerted by a structure or apparatus to which a counterweight must be applied. This invention finds a specific application in the field of physical exercise apparatus such as muscle exercise or rehabilitation apparatus.

2. Description of the Prior Art

Such physical exercise apparatus usually includes a load opposed by the muscular force of a user acting on an exercise member mechanically coupled to said load. These exercise members can be means such as bars, handles, pedals or the like and are referred to hereinafter as "exercise bars". This type of apparatus usually includes a cast iron weight which has to be lifted in a first work phase and held back on returning to its rest position in a second work phase. The first or "concentric" work phase shortens the user's muscles and the second or "eccentric" work phase involves controled extension of the users' muscles. The structure of the mechanical coupling between the cast iron weight and the exercise bar determines how much the latter moves and consequently the type of physical exercise provided by the apparatus. Most muscle exercise and rehabilitation exercises can be carried out using apparatus of this kind.

Proposals have been made to substitute a torque generator for the cast iron weights, capable of simulating their effect. This type of torque generator apparatus includes a direct current electric motor and an associated control device producing a torque resisting the force applied by the user during "concentric" work and exerting a force which must be opposed by the user during "eccentric" work.

In practice load simulator apparatus of this kind suffers from numerous drawbacks due in particular to the use of a direct current motor. For example, direct current motors cannot produce maximal torque at low speed and so the load simulator apparatus must have considerable gearing down between the motor and the exercise bar. This limits the maximum speed at which the exercise bar can be moved and also increases the effect of the inertia of the motor when its direction of rotation is changed, for example on changing from a "concentric" work phase to an "eccentric" work phase. Also, direct current motors are costly, heavy and bulky and have substantial maintenance requirements.

The present invention is directed to a torque generator device for simulating a load opposing a force which can, among other things, overcome these drawbacks.

SUMMARY OF THE INVENTION

To this end, the invention proposes a torque generator device for simulating a load opposing a force, suitable for physical exercise apparatus, including an asynchronous electric motor controlled by a flux vector control reversible type variable speed drive, said variable speed drive being controlled by torque regulator means so that said motor supplies a predetermined torque simulating said load.

The use of an asynchronous electric motor overcomes the drawbacks of the prior art force generator devices which are due, among other things, to the use of direct current motors, as explained above.

In the present context the term "vector control type variable speed drive" refers generally to variable speed drives for independently controling the magnetic flux in an asynchronous motor and the motor torque by the oriented field method which consists in commanding the input current of the stator using a rotating axis system. The oriented field method is well-known to specialists in asynchronous motor control.

The flux vector control variable speed drive is used to fix the flux in the asynchronous motor. Accordingly, the torque can be commanded independently by regulating the current fed into the stator winding of the motor. Thus the torque regulator means can simply comprise a current control loop. The resulting torque regulation is at least as good as that achieved for direct current motors. Thus the present invention can eliminate the drawbacks inherent to the direct current motors whilst retaining their essential advantages.

Practical applications of the oriented field method have appeared only very recently and in highly specialized technical fields. Currently available vector control variable speed drives are very complex in their structure and operation and consequently are very costly. As a consequence of this it is not feasible simply to transpose these existing variable speed drives to the technical field of torque generators for simulating loads supposing a force.

Another object of the present invention is therefore to provide a variable speed drive suitable for a torque generator device as defined above which decouples the torque and the flux in a much simpler manner than existing variable speed drives.

To this end, in a second aspect, the invention proposes an asynchronous motor variable speed drive comprising:

- a sensor responsive to the angular position of the rotor of said asynchronous motor to generate pulses whose frequency is dependent on the rotation frequency of said rotor and for assigning a sign to said pulses according to the rotation direction of said rotor;
- clock means for generating pulses at a predetermined frequency;
- an adder-subtractor for adding or subtracting the pulses from said angular position sensor to/from the pulses from said clock means according to the sign assigned to said sensor pulses, said adder-subtractor outputting with the pulses resulting from the operation effected a signal characterizing the sign of the result of said operation;
- counter-downcounter means for counting up or down the pulses resulting from the operation effected by said adder-subtractor according to the sign assigned to said resulting pulses;
- a memory adapted to produce sequential data representative of the orientation of a rotating induction field under the control of said counting-downcounting means;
- means for generating a system of polyphase supply currents for the stator of said asynchronous motor so as to create a rotating induction field whose rotation is dependent on said position data produced by said memory and whose amplitude is controlled by said torque regulator means.

This combination of means results in a rotation frequency of the rotating induction field which is offset by a certain amount relative to the rotation frequency of the rotor. This amount is controllable by choosing the clock frequency at which the pulses are added to or subtracted from the pulses from the position sensor. This clock frequency is chosen according to the slip characteristics specific to the asynchronous motor used, so that the resulting offset between the rotation speeds of the induction field and the rotor correspond to the value for which the torque produced by the motor is maximum. Fixing the value of slip in this way fixes the flux. This constitutes an effective and extremely simple manner of decoupling the torque from the flux. The direction of the torque is fixed by the direction of the offset between the rotation speed of the rotor and the rotation speed of the stator field. The direction of the torque can be reversed, for example, by inverting the sign of the pulses output by the position sensor according to the rotation direction of the motor and inverting the sign of the pulses produced by operation of the adder-subtractor according to whether the number of pulses from the sensor is greater than or less than the number of clock pulses. The value of the torque can be controled independently by varying the amplitude of the rotating field, which is effected by means of the external set point. This set point can be a voltage fixing the amplitude of each of the currents of the polyphase current system, for example.

This external set point is fixed by the torque regulator means of the torque generator device. This can simply be a closed loop controlling a set point voltage applied to said generator means, according to a control voltage set by the user. If the gearing down between the asynchronous motor and the exercise bar is not excessive, a torque generator device in accordance with the invention controlled by a control loop of this kind provides satisfactory load simulation. A high gear ratio is not needed as the asynchronous motor can supply the maximum torque at low speeds. Nevertheless, gearing down must be used if the torque generator device is to produce a high torque using an asynchronous motor of reasonable size and power rating. In this case the problem already mentioned in connection with direct current motors arises, namely the effect of the inertia of the motor, especially on reversing the direction of rotation. For example, when the user stops applying any force after a "concentric" work phase the motor should stop immediately due to the effect of the torque applied by the variable speed drive, but because of its inertia it in practise continues to rotate.

To overcome this problem, and in accordance with a further aspect, the present invention proposes a torque generator device as defined above wherein the torque regulator means includes a force sensor for measuring the force which said torque generator device opposes, said measured force being compared with a predetermined reference force to provide a basis for controling the variable speed drive current.

As a result, the current fed into the asynchronous motor is directly proportional to the result of comparing the actual force applied to the exercise bar with the predetermined reference force, the current being reduced when the force applied is greater than the reference force and increased in the contrary case. The variable speed drive therefore compensates automatically for the effects of inertia as it fixes a torque which is dependent on the actual force exerted by the motor and which therefore allows for said inertia effects.

If a still higher gearing down ratio is used, torque control based on the output of a force sensor as just described will not advantageously be usable for low values of the predetermined reference force. At the start of a concentric work phase a starting torque must be supplied to the motor for its inertia to be overcome. If the starting torque is less than the torque corresponding to the predetermined force, it is compensated by the control loop as already explained. On the other hand, if the starting torque is such that the force applied is greater than the force for which a null current is fed to the motor, the control loop being unable to do more than zero the current fed into the asynchronous motor, the lower limit of efficiency of the control loop is exceeded.

To overcome this problem, in a still further aspect, the present invention proposes to add to the torque generator device switching means commanded by the force sensor for reversing the direction of the torque exerted by the asynchronous motor and consequently modifying the control effect of the torque regulator means if the force measured by the force sensor exceeds an upper limit which is dependent on the predetermined reference force.

Thus if the lower limit of the control loop is exceeded at the start of a "concentric" work phase the asynchronous motor which was previously opposing the movement assists said movement in such as way as to overcome the starting torque. The torque regulator means cause the current fed into the motor to increase if the force applied is greater than the reference force or to decrease in the contrary case. This arrangement quickly brings the applied force into the range between the limits of the control loop. When the applied force exceeds the predetermined limit the switching means returns the torque generator device to its normal operating mode.

The features and advantages of the invention emerge from the following description with reference to the appended drawings.

BRIEF DESCRIPTION OF THE DRAWINGS

FIG. 2 is a view in elevation of a physical exercise machine to which a torque generator device in accordance with the invention is applied.

FIG. 3 is a view in elevation of the machine as seen in the direction of the arrow III in FIG. 2.

DETAILED DESCRIPTION OF THE PREFERRED EMBODIMENT

Figure 1:
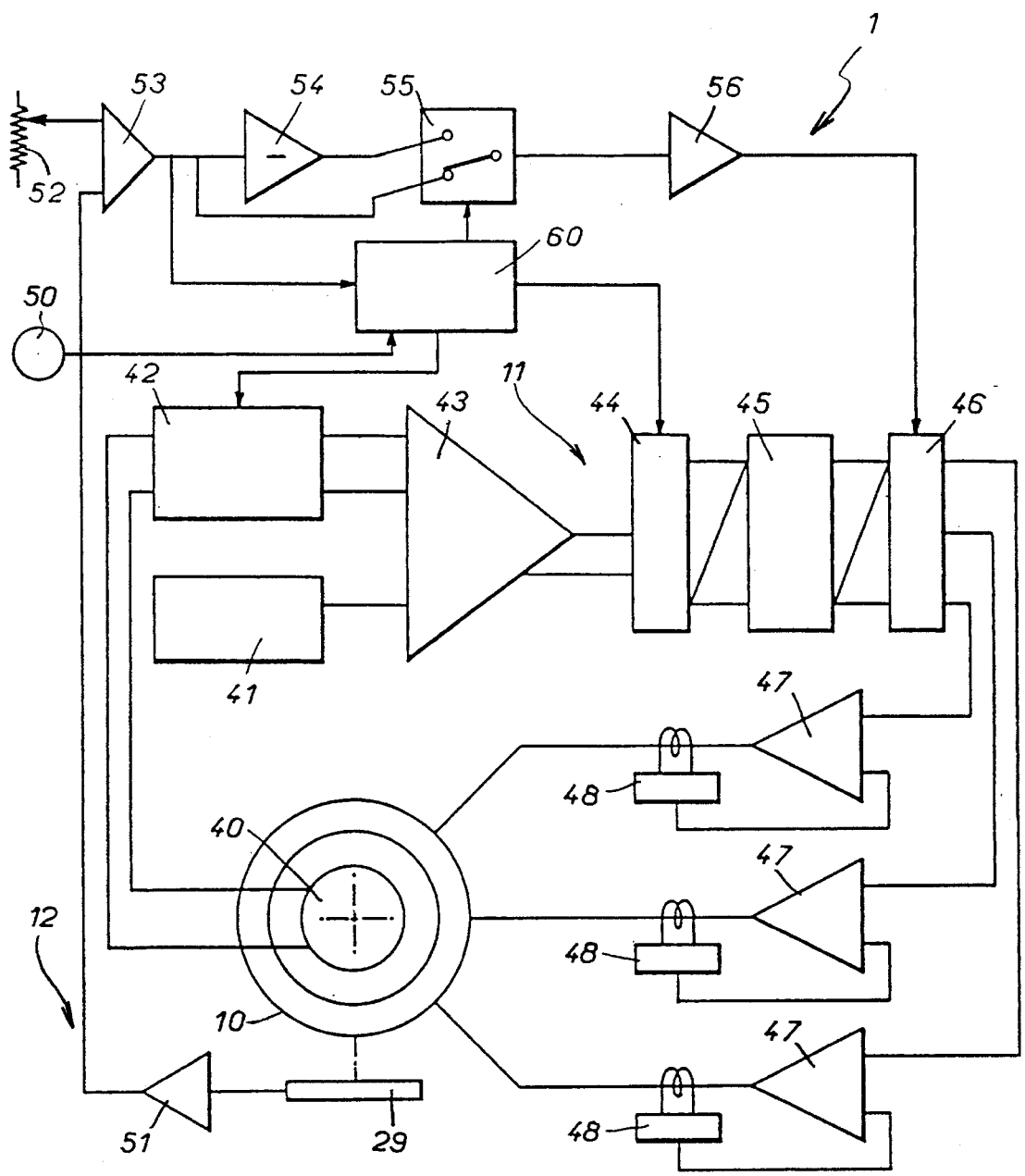
FIG. 1 is a diagrammatic view of an asynchronous motor control device for a torque generator device in accordance with the invention.

Referring to FIG. 1, the torque generator device 1 generally comprises a three-phase asynchronous induction motor 10 controlled by a flux vector control reversible type variable speed drive 11 and provided with a torque regulation control loop 12.

Referring to FIGS. 2 and 3, the torque generator device 1 is installed on a physical exercise machine 2. The physical exercise machine 2 comprises a base 20 to which is fixed a column 21 with two struts 22 between the base and the upper end of the column 21. The motor 10 is installed on the base 20. The outer end of the shaft of the motor 10 carries a sprocket 23 coupled by a chain 28 to a plate 24. The plate 24 is mounted at one end of a shaft 25 supported by two bearings 26 and 27. The bearing 26 is fixed directly to the base 20. The bearing 27 is mounted on a force measurement bar 29 fixed to the base 20. The shaft 25 carries a pulley wheel 30 halfway between the bearings 26 and 27. A carriage 31 is adapted to slide on the column 21. The upper and lower ends of the carriage 31 are respectively fixed to opposite ends of a chain 33 which runs in a pulley wheel 32 at the top of the column 21 and in the pulley wheel 30. The carriage 31 carries an exercise bar 34 which can be operated by a user. The travel of the carriage 31 along the column 21 is limited at the top of the column by a top abutment 36 and at the bottom of the column by a bottom abutment 35.

The force measuring bar 29 is used to measure the vertical force exerted on the pulley wheel 30 by the chain 33 and consequently the force exerted by the user on the exercise bar 34. Note that the force measuring bar is on a substantially immobile part of the exercise machine 2 and near the asynchronous motor and its control unit, which eliminates the problems that would arise in wiring a sensor installed on a mobile member such as the carriage 31, for example.

Referring again to FIG. 1, the variable speed drive 11 generally comprises an angular position sensor 40 mounted on the asynchronous motor 10, a variable frequency clock signal generator 41, an adder-subtractor 43 connected to said clock signal generator 41 and to said angular position sensor 40 by an interface 42, a counter-downcounter 44 connected to said adder-subtractor 43, a read-only memory 45 connected to said counter-downcounter 44, a digital-to-analog converter 46 connected to said read-only memory 45 and three current amplifiers 47 connected to said converter 46, each amplifier having at its output a current sensor 48 connected to the input of said amplifier. The outputs of the three amplifiers 47 feed respective phase windings of the asynchronous motor.

The angular position sensor 40 is an optical sensor which is responsive to equi-angularly spaced marks on a disk fitted to the rotor shaft of the asynchronous motor 10. This sensor 40 can have a low resolution. This sensor 40 is adapted to generate two streams of squarewave signals with a phase-difference of 90° characteristic of the angular displacement of the rotor, the interface 42 being adapted to determine the direction of rotation of the motor by comparing said streams of signals and then adding them to produce a single stream of pulses, each pulse characterizing a given step of angular displacement of the motor. The interface 42 therefore outputs two signals to the adder-subtractor 43, one being a binary signal whose level is representative of the direction of rotation of the rotor of the motor 10 and the other of which is a stream of pulses at a frequency dependent on the rotation frequency of said rotor. The interface 42 is also connected to switching means 60 for inverting the level of the binary signal assigned to a given rotation direction. To be more precise, for a first position of the switching means 60 clockwise rotation of the rotor produces a binary signal at the high level whereas for a second position of the switching means clockwise rotation of the rotor produces a low level signal. The switching means 60 are described in more detail below.

The adder-subtractor 43 is adapted to add pulses from the interface 42 to the clock pulses when the binary signal output by said interface 42 is at the high level and to subtract said interface pulses from said clock pulses when said binary signal is at the low level. The adder-subtractor 43 is adapted to send two signals to the counter-downcounter 44. The first signal is a stream of pulses corresponding to the result of the operation carried out by the adder-subtractor, the frequency of this signal corresponding to the rotation frequency of the rotor modified up or down by the clock frequency. The second signal is a binary signal which is high when the result of the operation effected by the adder-subtractor is negative and low if this result is positive.

The counter-downcounter 44 is adapted to count up or down in response to pulses output by the adder-subtractor 43, depending on the level of the binary signal output by the latter. The switching means 60 are adapted to change the counting direction for a given level of the binary signal. To be more precise, for the first position of said switching means the counter-downcounter counts the pulses when the binary signal level is low, whereas for the second position of the switching means the counter-downcounter counts the pulses if the binary signal is high. This counter-downcounter can have a count value running from zero pulses counted up to a maximum number of pulses counted. This counter-downcounter is adapted to operate in a loop, i.e. the zero count value and the maximum count value are the same. Thus if the counter is at the zero count value and the counter-downcounter counts down one pulse, the count value takes the maximum count value less one pulse. Likewise, if the count value is maximum and the counter-downcounter counts up one pulse, the count value goes to one.

The read-only memory 45 contains data representative of three sinusoids with a relative phase difference of 120°. This data is separated into groups each corresponding to the ordinate positions of these sinusoids for a given abscissa value, the abscissa values associated with these groups of data being regularly spaced. Each group of data is associated with a count value of the counter-downcounter 44, the read-only memory 45 producing said group of data when the counter-downcounter reaches said associated value. These three sinusoids represent the waveform of the three signals to be fed into the respective phase windings of the stator of an asynchronous motor to obtain a rotating induction field. The read-only memory therefore contains only a series of groups of data each corresponding to one orientation of a rotating induction field. A complete loop of the counter-downcounter 44 corresponds to the scanning of all the groups of data contained in the read-only memory 45 and therefore to a 360° rotation of the rotating induction field whose orientation these groups of data represent.

Following conversion of the digital data output by the read-only memory 45 by the digital-to-analog converter 46, the three outputs of the latter converter carry respective sinusoidal analog signals with a phase difference of 120° and whose frequency depends on the scanning effected by the counter-downcounter 44. The amplitude of these sinusoids depends on the reference voltage of the digital-to-analog converter 46. This voltage is fixed by the torque regulator control loop 12, one end of which operates on said converter, as is explained further below.

The amplifiers 47 are adapted to amplify the output signals of the converter 46. Each current sensor 48 is adapted to measure the waveform of the output signal of an amplifier 47 and to generate in consequence feedback signals at the input of said amplifier so that the latter supplies a perfectly sinusoidal current to the asynchronous motor.

The variable speed drive 11 therefore imposes in the asynchronous motor a rotating induction field whose direction and rotation frequency are respectively dependent on the level of the binary signal output by the adder-subtractor and on the frequency of the pulses output by said adder-subtractor. The frequency of the rotating induction field is therefore always offset from the rotor rotation frequency by an amount dependent on the clock frequency. The amplitude of the rotating induction field depends on the reference voltage of the converter 46 which is fixed by the control loop 12 which is described next.

Referring to FIG. 1, the torque regulator control loop 12 includes the force measurement bar 29, the first amplifier 51, a comparator 53 adapted to compare the output voltage of the amplifier 51 with a control voltage fixed by a potentiometer 52, an inverter 54, a switch 55 connected to the input and the output of the inverter 54 and a second amplifier 56. The output of the amplifier 56 is connected to the converter 46 so that the converter reference voltage is the output voltage of said amplifier 56.

The force measurement bar 29 is adapted to output a signal proportional to the force that it measures so that the output voltage of the amplifier 51 characterizes the force exerted by the user to oppose the torque exerted by the torque generator device 1. The output voltage of the potentiometer 52 characterizes a set point force fixed by the user. The comparator 53 is adapted to compare the output voltage of the potentiometer 52 and to output an error signal which conditions in one direction or the other the output voltage of the amplifier 56 according to the position of the switch 55.

In normal operation the switch 55 is in the position in which it connects the input of the amplifier 56 to the output of the comparator 53. In this case the output voltage of the amplifier 56 is increased if the force applied by the user is less than the set point force and reduced in the contrary case. However, as will emerge more clearly below, the switch 55 can be switched under the control of the switching means 60 in order to connect the input of the amplifier 56 to the output of the inverter 54. In this case the output voltage of the amplifier 56 is reduced if the force applied by the user is less than the set point force and increased in the contrary case.

As already explained, the switching means 60 are adapted to invert the level of the binary signal assigned to a given rotation direction and to reverse the counting direction corresponding to a given level of the binary signal output by the adder-subtractor. These switching means can be activated in two ways.

Firstly, the switching means 60 can switch between two positions under the control of a manual switch 50. These two positions are the first and second positions of the switching means 60 mentioned in the description of how the switching means act on the interface 42 and on the counter-downcounter 44. In the case of manual switching of the switching means the latter acts only on the interface 42 and the counter-downcounter 44.

In addition to this manual switching, the switching means 60 can be activated automatically under the control of the comparator 53. Automatic switching occurs when the output signal of the comparator 53 is greater than a predetermined value, i.e. when the force applied by the user exceeds an upper limit which is dependent on the predetermined reference force. In practise the predetermined value which trips the switching means 60 is equal to the value of the output signal from the comparator 53 causing a null reference voltage in the converter 46.

When automatic switching occurs the switching means 60 change from the position imposed by the manual switch 50 to the other position, and so act on the interface 42 and the counter-downcounter 44 and cause the switch 55 to connect the input of the amplifier 56 to the output of the inverter 54.

When the output signal from the comparator 53 falls below said predetermined value again, the switching means revert to the position imposed by the manual switch 50 and cause the switch 55 to reconnect the input of the amplifier 56 to the output of the comparator 53.

The torque generator device 1 described above has two modes of operation. The first is called the clockwise mode and the second the anti-clockwise mode.

To select the clockwise mode the user operates the manual switch 50 so that the switching means 60 are set to their first position. As a result, clockwise rotation of the rotor of the motor 10 causes the interface 42 to output a high level binary signal and a low level binary signal output by the adder-subtractor 43 activates the count mode of the counter-downcounter 44. As already explained, the clock frequency from the clock frequency generator 41 is chosen to suit the slip characteristics of the asynchronous motor so that the resulting offset between the rotation speed of the rotor and the rotation speed of the rotating induction field is that for which the motor torque is maximum.

In this clockwise mode the carriage 31 is in its rest position when it is abutted against the abutment 35 at the lower end of the column 21. To move the carriage from its rest position, the rotor of the motor 10 must turn anticlockwise. If the rotor is not turning, the counter-downcounter 44 counts the clock pulses so that the sinusoids in the read-only memory are scanned at the clock frequency to produce an induction field rotating clockwise. Thus the stator field opposes anticlockwise movement of the rotor. When the rotor is turning anticlockwise, during a "concentric" work phase, the frequency of the pulses from the interface 42, dependent on the rotation frequency of the rotor, is subtracted from the clock frequency. Thus, depending on the rotor rotation frequency, the rotating induction field turns either clockwise or anticlockwise, but in this latter case at a slower speed than the rotor. The motor thus opposes movement of the carriage 34. When the rotor turns clockwise, during an "eccentric" work phase, the frequency of the pulses from the interface 42 is added to the clock frequency. Accordingly, the rotating induction field rotates clockwise at a speed greater than the rotor. The motor thus draws the carriage to its rest position.

In conclusion, in clockwise mode the induction field rotation frequency is always offset towards the clockwise direction relative to the rotor rotation frequency. The torque generator device therefore produces a torque acting in a clockwise direction and tending to draw the carriage 31 towards its rest position on the abutment 35.

The value of the torque is fixed by the set point voltage set by the potentiometer 52 which can be adjusted by the user. The input of the amplifier 56 being connected to the output of the comparator 53, said amplifier 56 increases the reference voltage of the converter 46 if the output voltage of the amplifier 51 is less than the set point voltage set by the potentiometer 52, i.e. if the force measured by the force measuring bar 29 is less than the set point force. The amplitude of the rotating induction field, which is proportional to the reference voltage of the converter 46, being therefore increased, the value of the torque is increased until the measured force is equal to the set point force. Likewise, if the force measured by the force measuring bar 29 is greater than the set point force, the control loop 12 reduces the reference voltage of the converter 46 and consequently reduces the torque exerted by the motor 10 until the measured force is equal to the set point force. Thus the torque is regulated.

As already explained, the force to be applied to cause the motor to turn at the start of a "concentric" work phase can be very much greater than the set point force. The torque generator device then operates in the following manner.

When, at the start of a "concentric" work phase, the output signal of the comparator 53 exceeds the predetermined value to activate the switching means 60 the latter are moved to the second position and therefore cause the interface 42 to output a high level binary signal for an anticlockwise rotation direction of the rotor of the motor 10 and act on the counter-downcounter 44 in such a way that the output of a low level binary signal by the adder-subtractor activates the downcounting mode of counter-downcounter 44. Thus the adder-subtractor operates as an adder and the counter-downcounter operates as a downcounter. As a consequence of this, the stator field rotates anticlockwise, like the rotor, its rotation frequency being higher than that of the rotor. The torque direction therefore changes from clockwise to anticlockwise and so tends to assist movement of the carriage 31 towards the top of the column 21.

As already described, when activated automatically the switching means 60 cause the switch 55 to connect the input of the amplifier 56 to the output of the inverter 54. Consequently, when the force measured by the force measuring bar 29 is greater than the reference force the control loop 12 increases the reference voltage of the converter 46 instead of reducing it. Accordingly, the torque exerted by the motor is proportional to the difference between the measured force and the reference force. As a result, the output signal of the comparator 53 falls very quickly below the predetermined value to activate the switching means 60, which then return to the first position and cause the switch 55 to reconnect the input of the amplifier 56 to the output of the comparator 53.

To select the anticlockwise mode the user moves the switching means 60 to their second position by means of the switch 50. As a result, clockwise rotation of the motor causes the interface 42 to output a low level binary signal and the adder-subtractor 43 outputs a low level binary signal to activate the downcounting mode of the counter-downcounter 44. The clock frequency from the clock frequency generator 41 is the same as for the clockwise mode. In the anticlockwise mode the carriage 31 is in the rest position when it is abutted against the abutment 36 at the upper end of the column 21. To move the carriage from its rest position the motor 10 has to turn clockwise. If the rotor is not turning the counter-downcounter 44 counts down the clock pulses so that the sinusoids in the read-only memory are scanned at the clock frequency in the negative direction, which produces a clockwise rotating induction field. The stator field therefore opposes clockwise movement of the rotor. If the rotor turns clockwise, during a "concentric" work phase, the frequency of the pulses from the interface 42 is subtracted from the clock frequency. Depending on the rotor rotation frequency, the rotating induction field therefore turns either anticlockwise or clockwise but at a slower speed than the rotor. If the rotor turns anticlockwise, during an "eccentric" work phase, the frequency of the pulses from the interface 42 is added to the clock frequency. The induction field therefore turns anticlockwise at a speed greater than that of the rotor. The rotation frequency of the induction field is therefore in this instance offset towards the anticlockwise direction relative to the rotor rotation frequency. The torque generator device 1 therefore produces a torque which tends to draw the carriage 31 towards the top of the column 21. The anticlockwise mode of the torque generator device 1 therefore operates in the same manner as the clockwise mode but in the opposite direction, the rest position being the abutment position against the abutment 36 at the top of the column 21. As previously, when, at the start of a "concentric" work phase, the output signal of the comparator 53 exceeds the predetermined value for activation of the switching means 60, the latter change to the second position and cause the switch 55 to connect the input of the amplifier 56 to the output of the inverter 54. The torque generator device then assists movement of the carriage 31 towards the bottom of the column 21, the torque exerted being proportional to the difference between the applied force and the reference force, this situation applying until the output signal of the comparator 53 falls below the predetermined value for activating the switching means 60.

Of course, the present invention is not limited to the embodiments described and shown, there being many feasible variants as to its implementation and use.

For example, the speed of the torque generator device can be controlled in accordance with the invention so that the asynchronous motor rotates at constant speed regardless of the force applied by the user to the exercise bar. All that is needed to achieve this is to add a speed control loop whose output constitutes a set point for the torque control loop.

Further, it should be noted that the force generator device in accordance with the present invention, being adapted to simulate a cast iron weight of physical exercise apparatus, can equally well simulate any other type of counterweight.

Finally, note that the use of torque control based on measurements by a force sensor could be used in a torque generator device for a physical exercise machine using a direct current motor. In this case the force control loop would regulate the rotor current of the direct current motor.

There is claimed:

1. Physical exercise machine comprising a torque generator device for simulating a load opposing a force, comprising: an asynchronous electric motor; a flux vector control reversible type variable speed drive connected for supplying a variable speed drive current to said electric motor for controlling said electric motor; and torque regulator means connected for controlling said variable speed drive so that said electric motor supplies a predetermined torque simulating the load, wherein said torque regulator means include a force sensor for measuring the force opposed by said torque generator device, said measured force being compared with a predetermined reference force to provide a basis for controlling variable speed drive current, said torque generator device further comprising switching means controlled by said force sensor to reverse the direction of the torque exerted by said asynchronous motor and to modify accordingly the control action of said torque regulator means if the force measured by said force sensor exceeds an upper limit dependent on said predetermined reference force, said machine further comprising a column on which slides a carriage carrying an exercise bar, said carriage being coupled by a chain to a shaft mechanically coupled to said asynchronous motor, in which machine said force sensor is operative at the level of bearings supporting said shaft.

2. Torque generator device for simulating a load opposing a force, comprising: an asynchronous electric motor; a flux vector control reversible type variable speed drive connected for supplying a variable speed drive current to said electric motor for controlling said electric motor; and torque regulator means connected for controlling said variable speed drive so that said electric motor supplies a predetermined torque simulating the load, wherein said torque regulator means include a force sensor for measuring the force opposed by said torque generator device, said measured force being compared with a predetermined reference force to provide a basis for controlling variable speed drive current, said torque generator device further comprising switching means controlled by said force sensor to reverse the direction of the torque exerted by said asynchronous motor and to modify accordingly the control action of said torque regulator means if the force measured by said force sensor exceeds an upper limit dependent on said predetermined reference force.

3. Torque generator device according to claim 2 wherein said torque regulator means comprise a closed loop controlling the current of said variable speed drive.

4. Torque generator device according to claim 2 wherein said variable speed drive comprises:

- a sensor responsive to the angular position of the rotor of said asynchronous motor to generate pulses whose frequency is dependent on the rotation frequency of said rotor and for assigning a sign to said pulses according to the rotation direction of said rotor;
- clock means for generating pulses at a predetermined frequency;
- an adder-subtractor for adding or subtracting the pulses from said angular position sensor to/from the pulses from said clock means according to the sign assigned to said sensor pulses, said adder-subtractor outputting with the pulses resulting from the operation effected a signal characterizing the sign of the result of said operation;
- counter-downcounter means for counting up or down the pulses resulting from the operation effected by said adder-subtractor according to the sign assigned to said resulting pulses;
- a memory adapted to produce sequential data representative of the orientation of a rotating induction field under the control of said counting-downcounting means;
- means for generating a system of polyphase supply currents for the stator of said asynchronous motor so as to create a rotating induction field whose rotation is dependent on said sequential data produced by said memory and whose amplitude is controlled by said torque regulator means.

5. Torque generator device according to claim 4 wherein said asynchronous motor is a three-phase motor and said memory produces sequential digital data representative of three sinusoids with a phase difference of 120° and said generator means comprise a converter for converting said data from said memory into three analog signals whose amplitudes are modulated simultaneously by application of a voltage fixed by said torque regulator means, said three signals feeding the stator of said asynchronous motor.

* * * * *